United States Patent
Kubota et al.

(10) Patent No.: US 10,850,681 B2
(45) Date of Patent: Dec. 1, 2020

(54) VEHICLE-MOUNTED OPTICAL DEVICE AND VEHICLE-MOUNTED OPTICAL SYSTEM

(71) Applicant: HITACHI AUTOMOTIVE SYSTEMS, LTD., Hitachinaka (JP)

(72) Inventors: Chiemi Kubota, Tokyo (JP); Masayuki Okamura, Tokyo (JP); Akihiro Yamaguchi, Tokyo (JP); Hidenori Shinohara, Hitachinaka (JP); Kenichi Takeuchi, Hitachinaka (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 0 days.

(21) Appl. No.: 16/093,069

(22) PCT Filed: Mar. 2, 2017

(86) PCT No.: PCT/JP2017/008296
§ 371 (c)(1),
(2) Date: Oct. 11, 2018

(87) PCT Pub. No.: WO2017/179331
PCT Pub. Date: Oct. 19, 2017

(65) Prior Publication Data
US 2019/0202373 A1   Jul. 4, 2019

(30) Foreign Application Priority Data
Apr. 12, 2016 (JP) ................. 2016-079529

(51) Int. Cl.
*B60R 11/04* (2006.01)
*H04N 13/246* (2018.01)
(Continued)

(52) U.S. Cl.
CPC ............... *B60R 11/04* (2013.01); *B60S 1/026* (2013.01); *B60S 1/0848* (2013.01); *G01N 21/27* (2013.01);
(Continued)

(58) Field of Classification Search
CPC ... B60R 1/00; B60R 11/04; B60R 2011/0026; B60S 1/04; B60S 1/54; G06T 7/00;
(Continued)

(56) References Cited

U.S. PATENT DOCUMENTS

2004/0050076 A1* 3/2004 Palfy ..................... G01N 25/68
62/155
2009/0128629 A1 5/2009 Egbert et al.
(Continued)

FOREIGN PATENT DOCUMENTS

DE 102010015214 A1 10/2011
JP 62-128969 U 8/1987
(Continued)

OTHER PUBLICATIONS

International Search Report dated May 23, 2017 for the International Application No. PCT/JP2017/008296.
(Continued)

*Primary Examiner* — Dramos Kalapodas
(74) *Attorney, Agent, or Firm* — Volpe Koenig

(57) ABSTRACT

To provide a technique of eliminating condensation adhering to a vehicle inner side of the glass to improve the reliability of a vehicle-mounted optical device.
A vehicle-mounted optical device includes: an imaging unit that captures an outside of a vehicle through glass mounted to the vehicle to obtain an image; a condensation detection unit that detects condensation of the glass by determining whether an image in a predetermined range of a part of the image is in a predetermined state; and a condensation
(Continued)

removal device control processing unit that actuates a condensation removal device which removes condensation of the glass when the condensation detection unit detects the condensation.

5 Claims, 10 Drawing Sheets

(51) Int. Cl.
| | |
|---|---|
| *G01N 21/27* | (2006.01) |
| *G01N 21/78* | (2006.01) |
| *G03B 15/00* | (2006.01) |
| *B60S 1/08* | (2006.01) |
| *B60S 1/02* | (2006.01) |
| *G06K 9/46* | (2006.01) |
| *G02B 27/00* | (2006.01) |
| *G06K 9/00* | (2006.01) |
| *H04N 5/225* | (2006.01) |
| *B60R 11/00* | (2006.01) |

(52) U.S. Cl.
CPC ......... *G01N 21/78* (2013.01); *G02B 27/0006* (2013.01); *G03B 15/00* (2013.01); *G06K 9/00791* (2013.01); *G06K 9/4652* (2013.01); *H04N 5/2252* (2013.01); *H04N 13/246* (2018.05); *B60R 2011/0026* (2013.01)

(58) Field of Classification Search
CPC ............. H04N 13/246; H04N 9/00791; H04N 5/2252; G03B 15/00; G01N 21/78; G01N 21/27; G02B 27/0006; G06K 9/00791; G09F 13/04

See application file for complete search history.

(56) References Cited

U.S. PATENT DOCUMENTS

| | | | |
|---|---|---|---|
| 2010/0308094 A1 | 12/2010 | Stegmann et al. | |
| 2011/0277361 A1* | 11/2011 | Nichol | G02B 6/0018 40/541 |
| 2013/0039544 A1* | 2/2013 | Robert | B60S 1/0844 382/104 |
| 2013/0103257 A1* | 4/2013 | Almedia | B60Q 1/143 701/36 |
| 2014/0029008 A1 | 1/2014 | Hirai et al. | |
| 2014/0049774 A1* | 2/2014 | Horii | G01N 21/94 356/237.3 |
| 2015/0105976 A1* | 4/2015 | Shikii | B60H 1/00742 701/36 |
| 2016/0353083 A1 | 12/2016 | Aoki et al. | |
| 2019/0033579 A1* | 1/2019 | Ohsumi | H04N 5/2254 |

FOREIGN PATENT DOCUMENTS

| | | | |
|---|---|---|---|
| JP | 04-303047 A | 10/1992 | |
| JP | 2009-173260 A | 8/2009 | |
| JP | 2012-228916 A | 11/2012 | |
| JP | 2012228916 A * | 11/2012 | ............ B60S 1/0844 |
| JP | 2012-247257 A | 12/2012 | |
| JP | 2014-044196 A | 3/2014 | |
| JP | 2015-031564 A | 2/2015 | |
| JP | 2016-006406 A | 1/2016 | |
| WO | 2016/031523 A1 | 3/2016 | |

OTHER PUBLICATIONS

Extended European Search Report dated Oct. 21, 2019 for the European Patent Application No. 17782149.3.

* cited by examiner

CONDENSATION CAUSE STORAGE UNIT 131

RECOGNITION FAILURE CAUSE STORAGE UNIT 132

VEHICLE-MOUNTED OPTICAL DEVICE AND VEHICLE-MOUNTED OPTICAL SYSTEM

TECHNICAL FIELD

The present invention relates to a vehicle-mounted optical device and a vehicle-mounted optical system. This application is based upon and claims the benefit of priority from prior Japanese Patent Application No. 2016-79529, filed on Apr. 12, 2016, the entire contents of which are incorporated herein by reference.

BACKGROUND ART

One of background art in this technical field is JP 2009-173260 A (PTL 1). In this publication, it is described that "an optical module for an assistance system covering an ambient region of a vehicle has a camera 10 and an optical assembly. The camera is arranged in a region of an inner side of a pane of glass of a vehicle, in particular a windscreen 16, is directed into an ambient region of the vehicle, and with an objective 12 through which a distant region can be imaged in sharp focus on a first section of a sensor surface 13 of the camera. The optical assembly is arranged in a field of vision of the camera and by which a close region covering a detection region of the pane can be imaged in sharp focus on a second section of the sensor surface of the camera. Further, the invention further concerns a method for controlling a wiping interval of a windscreen wiper, in particular of a motor vehicle, by means of such an optical module.".

CITATION LIST

Patent Literature

PTL 1: JP 2009-173260 A

SUMMARY OF INVENTION

Technical Problem

In the technique described in the above-described PTL 1, there is no consideration on improvement of a poor field of view due to a water droplet (dew condensation water) adhering to a vehicle inner side of glass.

An object of the present invention is to provide a technique capable of eliminating dew condensation adhering to a vehicle inner side of glass to improve reliability of a vehicle-mounted optical device.

Solution to Problem

The present application includes a plurality of means for solving at least a part of the above-described problem, and an example thereof is given as follows. In order to solve the above-described problem, a vehicle-mounted optical device according to one aspect of the present invention includes: an imaging unit that captures an outside of a vehicle through glass mounted to the vehicle to obtain an image; a condensation detection unit that detects condensation of the glass by determining whether an image in a predetermined range of a part of the image is in a predetermined state; and a condensation removal device control processing unit that actuates a condensation removal device which removes condensation of the glass when the condensation detection unit detects the condensation.

Advantageous Effects of Invention

According to the present invention, it is possible to eliminate the condensation adhering to the vehicle inner side of the glass thereby improving the reliability of the vehicle-mounted optical device. Other objects, configurations, and effects which have not been described above become apparent from embodiments to be described hereinafter.

DESCRIPTION OF EMBODIMENTS

Figure 1:
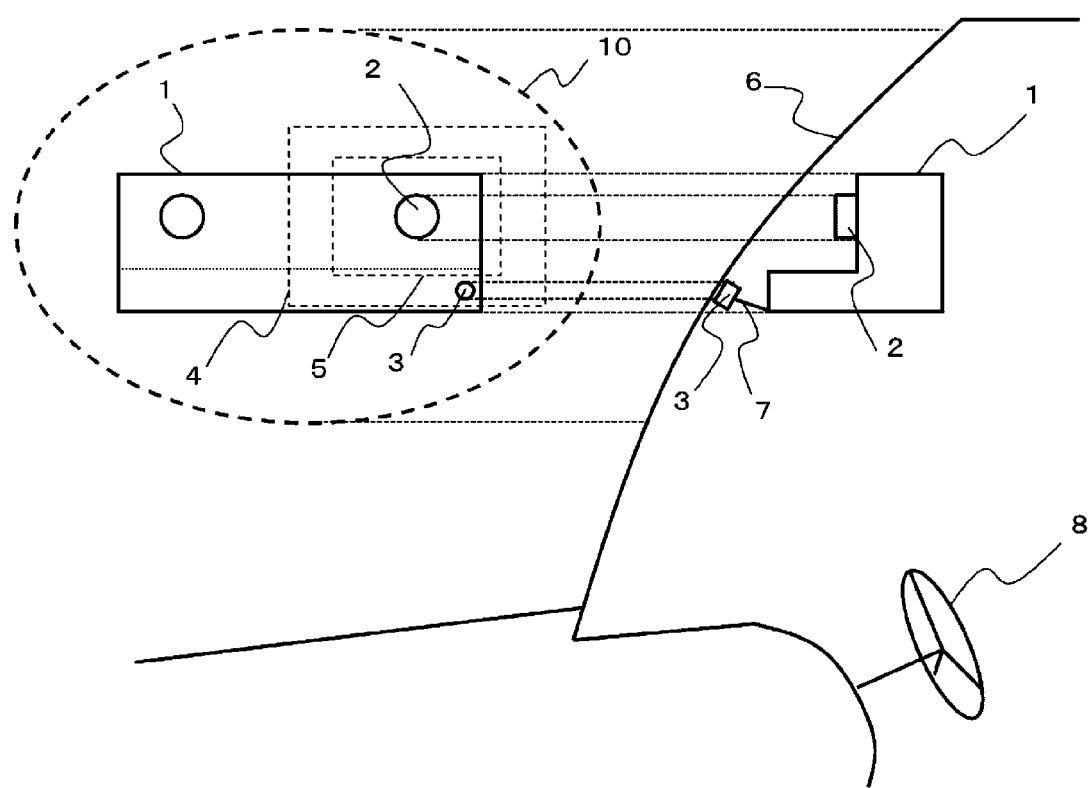
FIG. 1 is a view illustrating an outline of a vehicle-mounted optical system according to a first embodiment of the present invention.

Hereinafter, a first embodiment of the present invention will be described based on the drawings. Incidentally, the same reference numerals will be attached to the same members in principle in the entire drawing for describing the embodiments, and the repetitive description thereof will be omitted. In addition, in the embodiments below, it is obvious that the constituent components (including component steps and the like) are not necessarily required, excepting the case that is particularly demonstrated or a case in which the components are clearly required in principle. In addition, even when expressing that elements or the like are "made of A" or "formed of A", "having A", and "including A", elements other than A are of course not excluded except the case where it is particularly specified that A is the only element thereof. Similarly, in the embodiments below, when shapes, positional relationships, and the like of the constituent components are stated, it is assumed that those substantially approximate to or analogous to the shapes and the like are included excepting the case that is particularly demonstrated or a case in which the components are obviously inappropriate in principle.

In general, an optical device for an operation system that performs recognition of an external world of a vehicle has a camera which images a peripheral region of the vehicle. As a camera that images a peripheral region of a vehicle, a monocular optical device that acquires an image of the peripheral region of the vehicle, a multi-ocular optical device capable of calculating a distance from an image photographed using a plurality of optical devices are known. As a driving assistance system of a car, a system relating to travel control such as emergency automatic braking, inter-vehicle distance maintenance, lane deviation prevention, automatic accident avoidance, and the like has been devised.

In such a system, a multi-ocular optical device called a stereo camera is used as one of vehicle-mounted sensors configured to measure a distance to an object as an obstacle. Such a vehicle-mounted optical device is arranged in an inner side a pane of glass such as a windscreen of a vehicle, and it is conceivable that a field of view of the camera deteriorates due to a state of the glass such as stain, a water droplet, or the like on a window glass. When the field of view of the camera deteriorates, it is difficult to recognize an obstacle existing in the peripheral region of the vehicle so that there may occur a problem that the above-described driving assistance system does not properly operate. Examples of the state of the glass affecting the field of view of the camera include stain or a water droplet of rain, snow, dust, or the like mainly on an outer side of the vehicle, and stain or a water droplet of dew condensation water, dust, tobacco smoke, or the like on the inner side. Regarding raindrops on the outer side of the vehicle, there is known a technique of improving a poor field of view by detecting raindrops using an optical module as described in PTL 1 and controlling an operation of a windscreen wiper. On the other hand, there is no consideration on a water droplet (dew condensation water) adhering to a vehicle inner side of glass.

An image captured at the time of condensation closely resembles an image acquired in a situation where there is fog or a situation of being sprayed with water raised by a preceding vehicle at the time of traveling in rainy weather, and it is difficult to properly detect a condensation state from only the image.

Hereinafter, a vehicle-mounted optical system obtained by applying the first embodiment according to the present invention will be described in detail with reference to the drawings.

FIG. 1 is a view illustrating an outline of the vehicle-mounted optical system according to the first embodiment of the present invention. The vehicle-mounted optical system includes a vehicle-mounted optical device 100. The vehicle-mounted optical device 100 includes at least a camera housing 1 and a camera lens 2. In the present embodiment, the camera housing 1 is a stereo camera that performs image recognition and length measurement using two camera lenses 2. However, the invention is not limited thereto, and various cameras including one or a plurality of camera lenses 2 may be used.

In the camera housing 1, processing components such as an image sensor, which acquires an image by collecting light using the camera lens 2 and forming an image on a light receiving surface of a light receiving element such as a complementary MOS (CMOS) or a charge coupled device (CCD) provided therein, an integrated circuit (IC), which performs image processing such as calculation of a distance from a parallax image obtained from the plurality of camera lenses 2 to an object, and the like are arranged.

The camera housing 1 is arranged in a region of an inner side of a windscreen 6 to be attached of the vehicle, that is, inside the vehicle, and the camera lens 2 is directed to the peripheral region of the vehicle positioned at a front side of the vehicle when viewed in an advancing direction of the vehicle. That is, the camera lens 2 attached to the camera housing 1 includes a region of the outer side of the vehicle through the windscreen 6 as a viewing angle.

Figure 2:
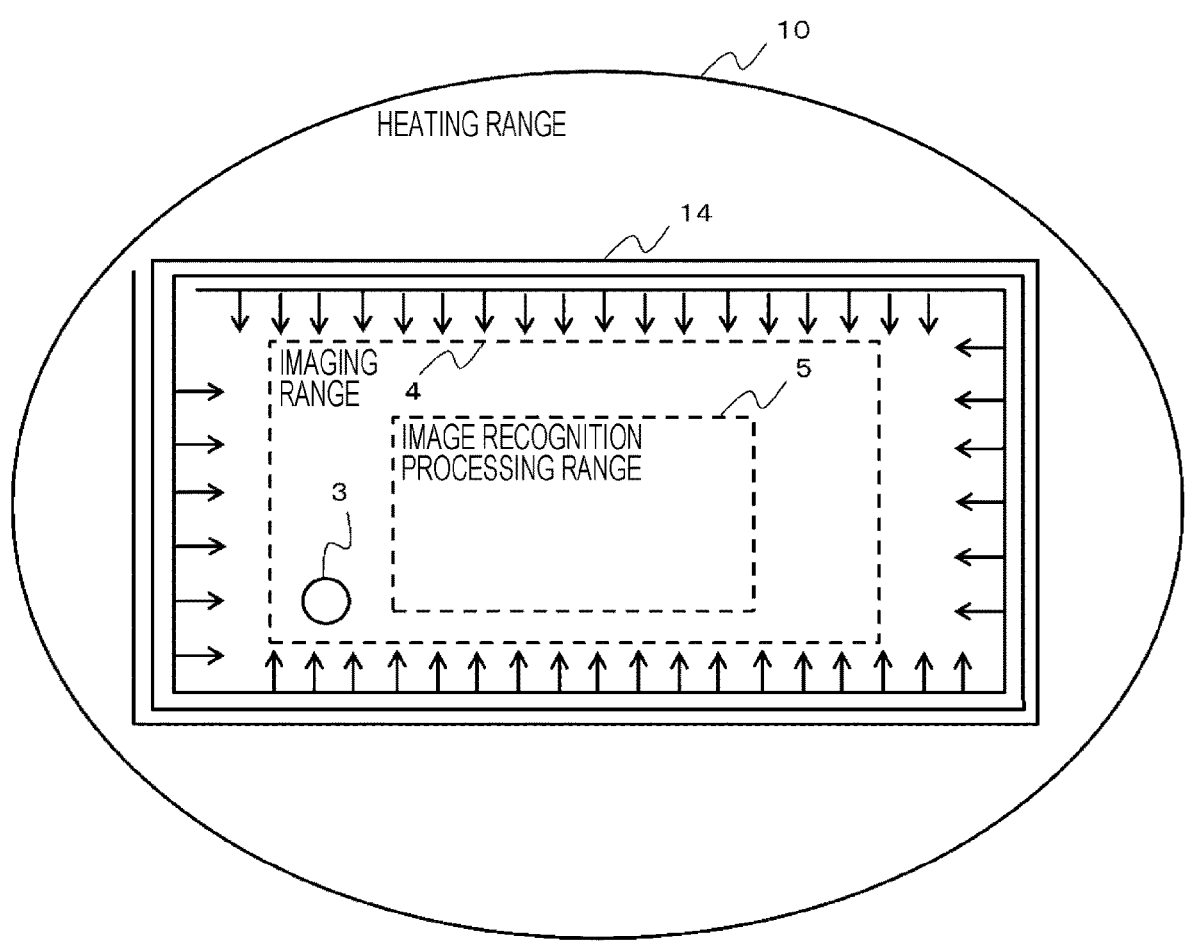
FIG. 2 is a view illustrating an imaging range.

FIG. 2 is a view illustrating an imaging range. FIG. 2 illustrates a positional relationship between an imaging range 4 on the windscreen 6 to be imaged by the camera housing 1 and the camera lens 2 and an image recognition processing range 5 which is a range mainly used for obstacle detection or the like out of a region included in the imaging range, a heating range 10 which is a range in which the windscreen 6 is overheated, an electric heating wire 14 which is a condensation removal device that removes condensation by heating the windscreen 6, and a moisture sensitive member 3 in contact with the windscreen 6. That is, the electric heating wire 14 is included in the heating range 10, the imaging range 4 is included in a range at an inner side of the electric heating wire 14, and the image recognition processing range 5 is included in a range at an inner side of the imaging range 4. In addition, the moisture sensitive member 3 is included in a range that is included in the imaging range 4 and not included in the image recognition processing range 5.

A description will be given returning to FIG. 1. The moisture sensitive member 3 is a member whose optical characteristics change depending on presence or absence of adhesion of a detection object (water generated by condensation in the present embodiment). The moisture sensitive member 3 is provided between the camera housing 1 and the windscreen 6 via a vibration control mechanism 7. The moisture sensitive member 3 is pressed by the vibration control mechanism 7 so as to contact the inner side of the windscreen 6. At this time, when an elastic body such as a helical spring and a leaf spring is used as the vibration control mechanism 7, the entire surface of the moisture sensitive member 3 can be stably brought into contact with the surface of the windscreen 6 against vibration or the like. When the moisture sensitive member 3 is brought into contact with the windscreen 6, dew condensation water generated on the surface of the windscreen 6 is taken into the moisture sensitive member 3 at an early stage, and thus, it is possible to early detect the generation of condensation.

Regarding the moisture sensitive member 3 in the present embodiment, the optical characteristics that change depending on adhesion of moisture include chromaticity, amount, transmittance, and the like of light. A compound which changes by forming a complex with water can be used as a material whose color changes. Examples of the compound that forms a complex with water include cobalt chloride, cobalt bromide, and the like.

A porous material whose transmittance changes by coming into contact with water can be used as a material whose transmittance changes. As the porous material, either an organic material or an inorganic material can be used, but an inorganic material strongly resistant to a high temperature and high humidity environment inside a vehicle is suitable. Examples of the inorganic porous material include silicic acid and silicate, barite powder, barium sulfate, barium carbonate, calcium carbonate, gypsum, clay, talc, alumina white, magnesium carbonate, and the like. These porous materials have a refractive index in the range of 1.4 to 1.8, and exhibit good transparency when absorbing water. Incidentally, examples of the silicate include aluminum silicate, aluminum potassium silicate, sodium aluminum silicate, aluminum calcium silicate, potassium silicate, calcium silicate, sodium calcium silicate, sodium silicate, magnesium silicate, potassium magnesium silicate, and the like.

In addition, when condensation is detected using a change in chromaticity of the moisture sensitive member 3, the moisture sensitive member 3 may be manufactured as follows. First, a water-complex forming product such as cobalt chloride is mixed with particles of inorganic oxides (alumina, silica, zirconia, and the like). Then, a solvent and resin are mixed to form a paste, and the resultant is molded to have predetermined size, shape, and thickness and dried to obtain a member in a pellet shape.

The invention is not limited thereto, and for example, the moisture sensitive member 3 may be formed by applying the above-described paste at a predetermined position on the windscreen 6.

As the moisture sensitive member 3 is manufactured in this manner, it is possible to expect improvement of thermal durability due to mixing with the inorganic oxide and improvement of the durability as moisture repeatedly adheres. Incidentally, it is also possible to manufacture a pellet to be used for detection of condensation caused by a change in transmittance in the same manner by producing a paste using the inorganic porous material instead of the inorganic oxide.

In addition, the optical characteristic used for condensation detection in the moisture sensitive member 3 may be one of the above-described characteristics, but can also be used in combination. For example, it is also possible to adopt a configuration in which the transmittance change and the chromaticity change are combined.

Incidentally, the moisture sensitive member 3 is brought into contact with the windscreen 6 via the vibration control mechanism 7 arranged in the camera housing 1 in FIG. 1, but the invention is not limited thereto. For example, it is also possible to directly form the moisture sensitive member 3 on the windscreen 6 without using the vibration control mechanism 7. Examples of a method for forming the moisture sensitive member 3 include a method of attaching the moisture sensitive member 3 to the windscreen using an adhesive, a method of bringing a sensitive member into contact with the windscreen 6 by coating with the moisture sensitive member 3 in the form of a paste, and the like.

As described above, an arrangement position of the moisture sensitive member 3 is inside the imaging range 4 of the camera housing 1 outside the image recognition processing range 5 configured to detect an obstacle around the vehicle. As the moisture sensitive member 3 is arranged at this position, it is possible for the camera housing 1 to detect the change of the optical characteristic of the moisture sensitive member 3, and further, it is possible to avoid interference of recognition processing of the obstacle around the vehicle.

Figure 3:
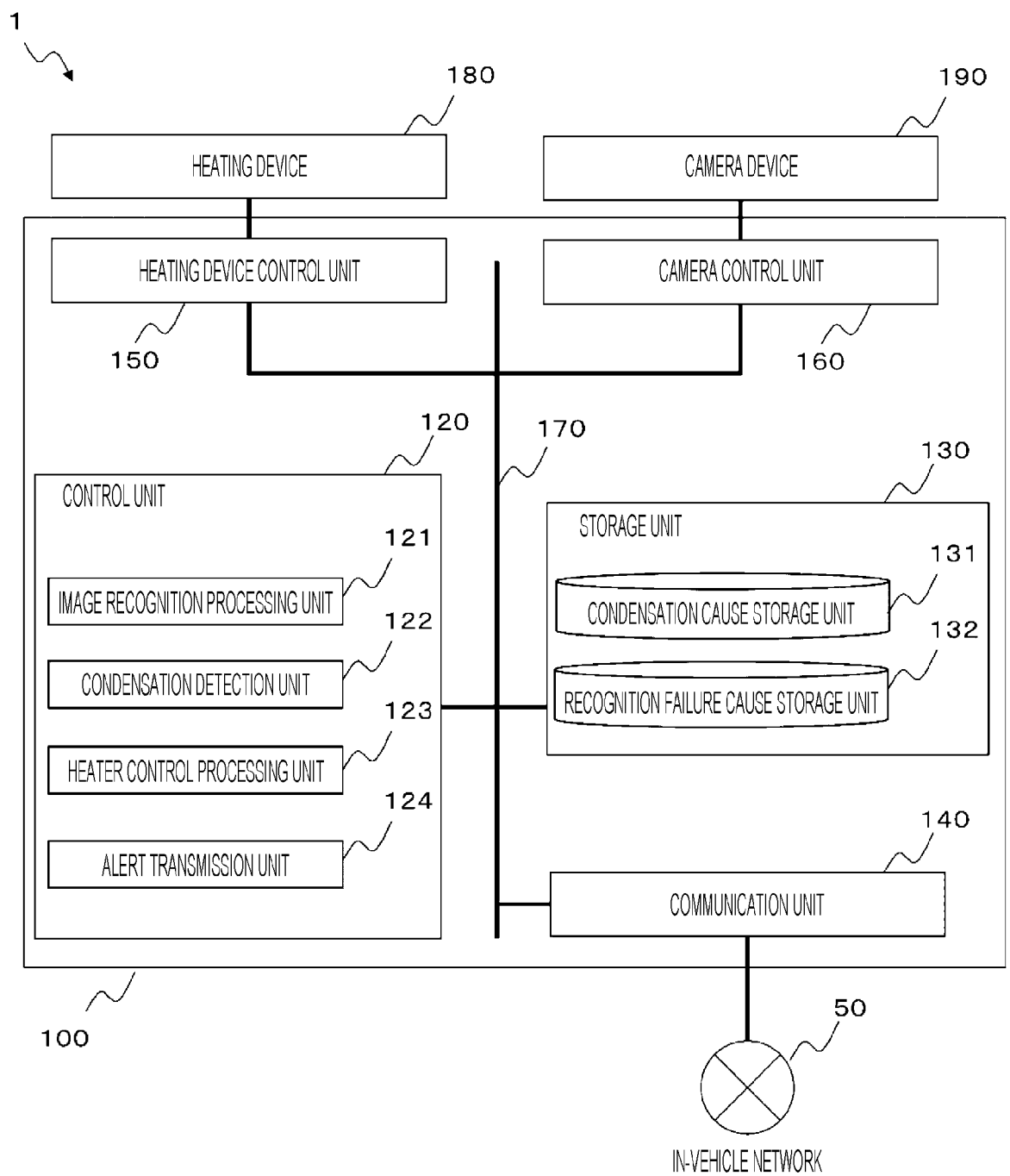
FIG. 3 is a diagram illustrating a configuration of the vehicle-mounted optical system.

FIG. 3 is a diagram illustrating a configuration of the vehicle-mounted optical system according to the present embodiment. The vehicle-mounted optical system includes the vehicle-mounted optical device 100 corresponding to the camera housing 1, a camera device 190 connected to the vehicle-mounted optical device 100, and a heating device 180 connected to the vehicle-mounted optical device 100. In addition, the vehicle-mounted optical device 100 is connected to an in-vehicle network 50 so as to be capable of performing communication. Incidentally, the in-vehicle network 50 may be, for example, an in-vehicle local area network (LAN) or a predetermined vehicle control network such as a controller area network (CAN) or a local interconnect network (LIN).

The vehicle-mounted optical device 100 includes a control unit 120, a storage unit 130, a communication unit 140, a heating device control unit 150, a camera control unit 160, and a bus 170 that connects these units to each other. For example, the vehicle-mounted optical device 100 realizes a characteristic processing function (each processing unit of the vehicle-mounted optical device 100) by processing of a software program.

The storage unit 130 includes a condensation cause storage unit 131 and a recognition failure cause storage unit 132.

Figure 4:
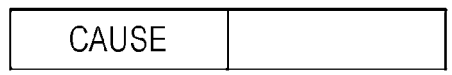
FIG. 4 is a diagram illustrating a data structure stored in a condensation cause storage unit.

FIG. 4 is a diagram illustrating a data structure stored in the condensation cause storage unit. The condensation cause storage unit 131 stores information relating to whether a cause of a reaction of the moisture sensitive member 3 is condensation.

Figure 5:
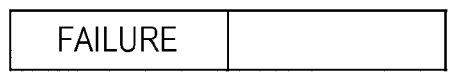
FIG. 5 is a diagram illustrating a data structure stored in a recognition failure cause storage unit.

FIG. 5 is a diagram illustrating a data structure stored in the recognition failure cause storage unit. The recognition failure cause storage unit 132 stores information for identifying a cause of a recognition failure generated in the camera housing 1.

The control unit 120 includes an image recognition processing unit 121, a condensation detection unit 122, a heater control processing unit 123, and an alert transmission unit 124.

The image recognition processing unit 121 transmits information, obtained by performing a predetermined image recognition process using an image captured and obtained by the camera device 190, to a predetermined device via the in-vehicle network 50. More specifically, the image recognition processing unit 121 performs a predetermined process of exerting influence on a travel control system of the vehicle using an image specified in a predetermined position and range out of the image captured by the camera device 190 under the control of the camera control unit 160.

For example, the image recognition processing unit 121 detects an obstacle using a parallax image obtained by the camera device 190, measures a direction and a distance to the obstacle, and transmits information on the obtained obstacle and the distance to the obstacle to a control device (not illustrated) such as an engine control unit (ECU). The control device such as the ECU, which has received the information on the direction and distance of the obstacle, uses the information to perform various types of control such as steering control for warning of obstacle avoidance and an avoidance operation, control of a braking device such as an ABS, control of an impact reduction device such as an airbag, and accident video recording.

The condensation detection unit 122 detects condensation of the windscreen 6 by determining whether an image in a predetermined range of a part of the image captured and obtained by the camera device 190 is in a predetermined state. Specifically, the condensation detection unit 122 determines that an image is in the predetermined state when the image of the moisture sensitive member 3 positioned inside the imaging range 4 within a range excluding the image recognition processing range 5 has any one of a predetermined chromaticity, a predetermined luminance, or an edge detection amount equal to or less than a predetermined amount.

The heater control processing unit 123 instructs the heating device control unit 150 that controls the heating device 180 to start or end heating.

When an abnormality occurs in the processing of the control unit 120 or when a predetermined situation that is not normal occurs as a result of being normally processed, the alert transmission unit 124 transmits alert information to another device connected to the in-vehicle network 50 via the communication unit 140.

The communication unit 140 starts communication in accordance with a predetermined standard with the other device connected to the in-vehicle network 50, and transmits and receives information.

The heating device control unit 150 performs start and end of heating, heating interruption in the case of overheating, temperature control, and the like with respect to the heating device 180 to be connected.

The camera control unit 160 performs various types of camera control with respect to the camera device 190 to be connected such as an instruction of imaging, start and end of capturing of a moving image, adjustment of an angle of view, adjustment of a focal length, adjustment of a capturing direction, adjustment of resolution, and exposure control. In addition, the camera control unit 160 transmits the captured image to the control unit 120.

The heating device 180 is the electric heating wire 14 affixed to the windscreen 6 or the electric heating wire embedded in the windscreen 6. Alternatively, the heating device 180 may be an air blowing device that injects hot air toward the windscreen 6.

The camera device 190 specifies brightness and darkness of each pixel based on an electric charge generated depending on the amount of light formed on an imaging element by a condenser lens, thereby generating image information. The camera device 190 is provided with equipment for a vehicle-mounted camera such as a lens, an aperture, a shutter, an imaging element, a power supply, a communication device, and the like.

Figure 6:
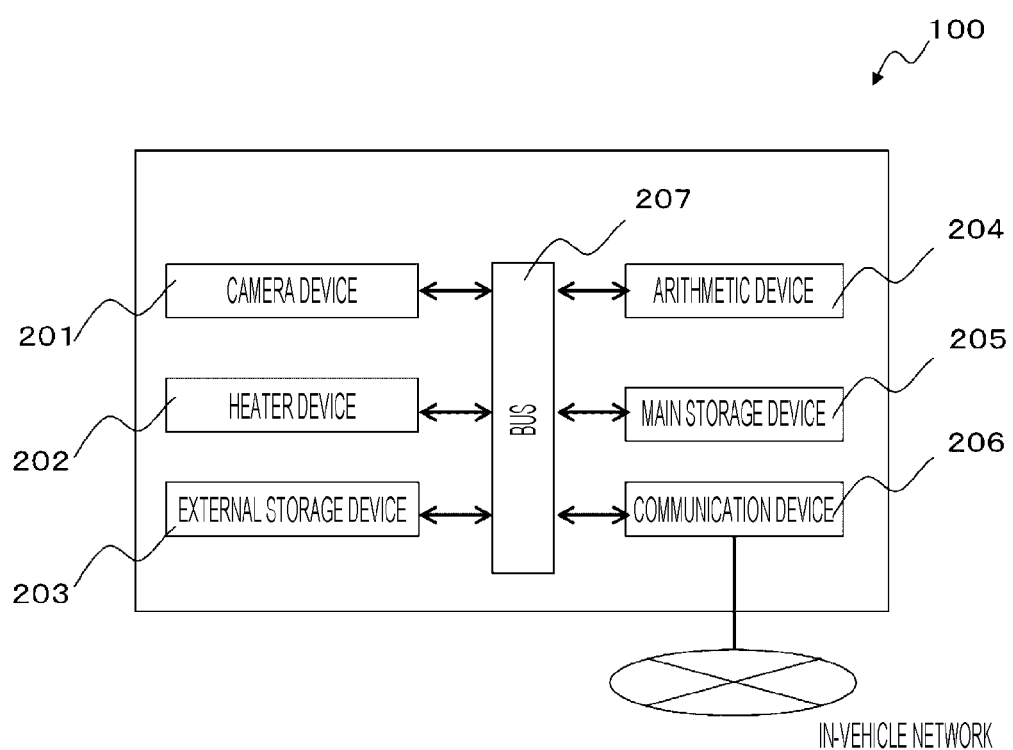
FIG. 6 is a diagram illustrating a hardware configuration of a vehicle-mounted optical device.

FIG. 6 is a diagram illustrating a hardware configuration of the vehicle-mounted optical device. The vehicle-mounted optical device 100 includes an arithmetic device 204 such as a central processing unit (CPU), a main storage device 205 such as a memory, an external storage device 203 such as a hard disk or a solid state drive (SSD), a camera device 201, a heater device 202, a communication device 206 such as a network interface card (NIC), and a bus 207 connecting these devices.

The communication device 206 is a wired communication device that performs wired communication via a network cable or a wireless communication device that performs wireless communication via an antenna. The communication device 206 communicates with the other devices connected to the network.

For example, the main storage device 205 is a memory such as a random access memory (RAM). The external storage device 203 is a nonvolatile storage device such as a so-called hard disk, an SSD, and a flash memory that can store digital information.

The camera device 201 is a camera having an imaging element and a camera lens.

The heater device 202 is a device that generates heat and warms ambient air and the like.

The image recognition processing unit 121, the condensation detection unit 122, the heater control processing unit 123, and the alert transmission unit 124 described above are realized by a program that causes the arithmetic device 204 to perform processing. This program is stored in the main storage device 205 or the external storage device 203, loaded on the main storage device 205 for execution, and executed by the arithmetic device 204.

In addition, the condensation cause storage unit 131 and the recognition failure cause storage unit 132 are realized by the main storage device 205 and the external storage device 203.

In addition, the communication unit 140 that is connected so as to be capable of communicating with another device or the like connected to the in-vehicle network is realized by the communication device 206. In addition, the camera device 190 is realized by the camera device 201, and the heating device 180 is realized by the heater device 202.

An example of the hardware configuration of the vehicle-mounted optical device 100 of the vehicle-mounted optical system in the present embodiment has been described as above. However, the invention is not limited thereto, and may be configured using another hardware.

Incidentally, the vehicle-mounted optical device 100 may have known elements such as an operating system (OS), middleware, an application, and the like although not illustrated.

[Description of Operation]

Next, an operation of the vehicle-mounted optical system according to the present embodiment will be described. Incidentally, this description of the operation is given with an example in the case where chromaticity is used as the changing optical characteristic of the moisture sensitive member.

Figure 7:
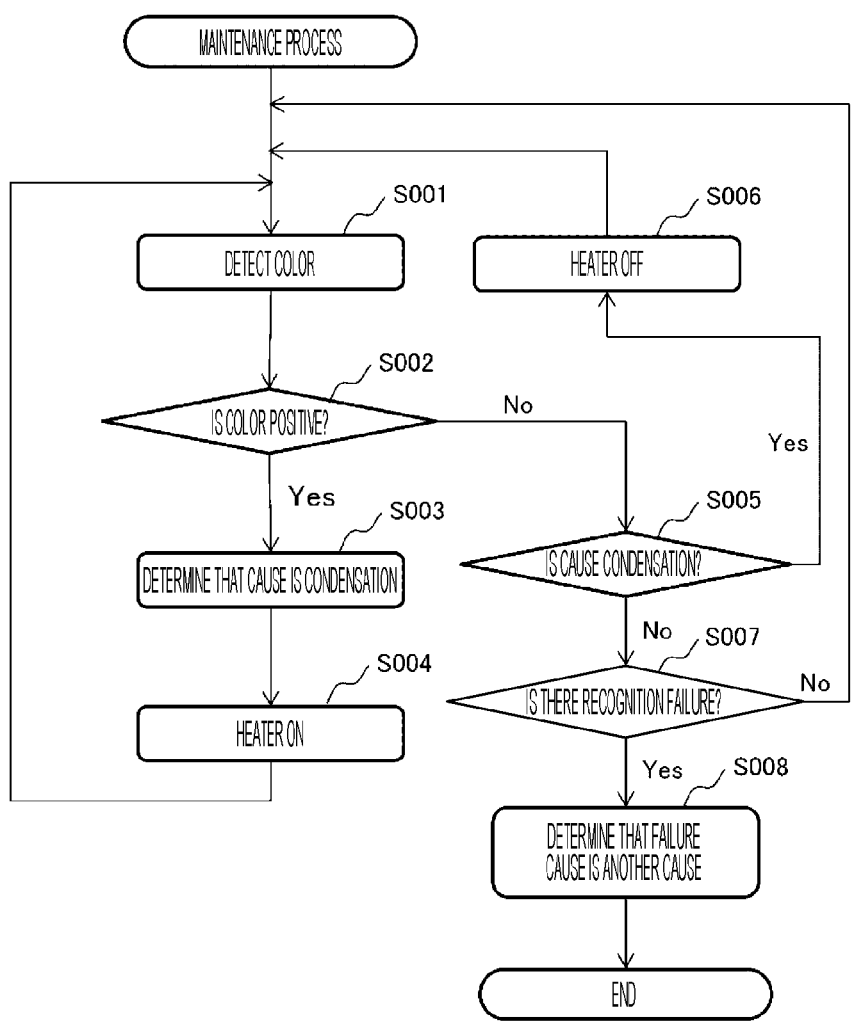
FIG. 7 is a diagram illustrating an operation flow of a first maintenance process.

FIG. 7 is a diagram illustrating an operation flow of a first maintenance process. The first maintenance process is started when the vehicle-mounted optical device 100 is activated.

First, the condensation detection unit 122 obtains an image from the camera control unit 160 and detects a color of the image of the moisture sensitive member 3 positioned inside the imaging range 4 inside the range excluding the image recognition processing range 5 (step S001).

Then, the condensation detection unit 122 determines whether the color is positive (step S002). Specifically, when the color detected in step S001 has a predetermined chromaticity, the condensation detection unit 122 determines that the color is positive, that is, condensation has occurred. Incidentally, when determining whether the color has the predetermined chromaticity, it may be determined based on whether the color of the moisture sensitive member 3 has a predetermined luminance or more with respect to a predetermined RGB components, or it may be determined to be positive if the color is similar to a color to a predetermined degree or more when being compared with a reference color region adjoining the moisture sensitive member 3 (region having a color substantially coinciding with the color of the moisture sensitive member 3 containing moisture).

When the color is positive (in the case of "Yes" in step S002), the condensation detection unit 122 determines that the cause is condensation (step S003). Specifically, the condensation detection unit 122 causes the condensation cause storage unit 131 to store information specifying the cause as the condensation.

Then, the heater control processing unit 123 turns on the heater (step S004). Specifically, the heater control processing unit 123 issues an instruction to the heating device control unit 150 to start heating. Then, the condensation detection unit 122 returns the control to step S001.

If the color is not positive ("No" in step S002)), the condensation detection unit 122 determines whether it has been determined that the cause is condensation (step S005). Specifically, the condensation detection unit 122 refers to the condensation cause storage unit 131 and determines that it has been determined that the cause is condensation if the information specifying the cause as the condensation is stored.

If it has been determined that the cause is the condensation ("Yes" in step S005), the heater control processing unit 123 turns off the heater (step S006). Specifically, the heater control processing unit 123 issues an instruction to the heating device control unit 150 to end heating. Then, the condensation detection unit 122 deletes the information specifying the cause as the condensation from the condensation cause storage unit 131, and returns the control to step S001.

If it has not been determined that the cause is condensation ("No" in step S005)), the condensation detection unit 122 determines whether a recognition failure has occurred (step S007). Specifically, the condensation detection unit 122 inquires of the image recognition processing unit 121 whether the recognition failure has occurred. When no recognition failure has occurred (in the case of "No" in step S007), the condensation detection unit 122 returns the control to step S001.

When the recognition failure occurs ("Yes" in step S007), the condensation detection unit 122 determines that the cause of the failure is another cause (step S008). Specifically, the condensation detection unit 122 causes the recognition failure cause storage unit 132 to store information specifying the failure cause as "other". Then, the alert transmission unit 124 transmits an alert indicating that the recognition failure has occurred to another device connected to the in-vehicle network 50 via the communication unit 140. Then, the condensation detection unit 122 terminates the maintenance process.

The processing flow of the maintenance process has been described as above. According to the maintenance process, when the moisture sensitive member 3 is sensitive to moisture, it is possible to remove condensation by heating the windscreen 6 using the heater. Thus, it is possible to eliminate the condensation adhering to the vehicle inner side of the glass thereby improving the reliability of the vehicle-mounted optical device. In addition, the maintenance of the vehicle-mounted optical device 100 is automatically performed, and power consumption can be suppressed to be low.

Figure 8:
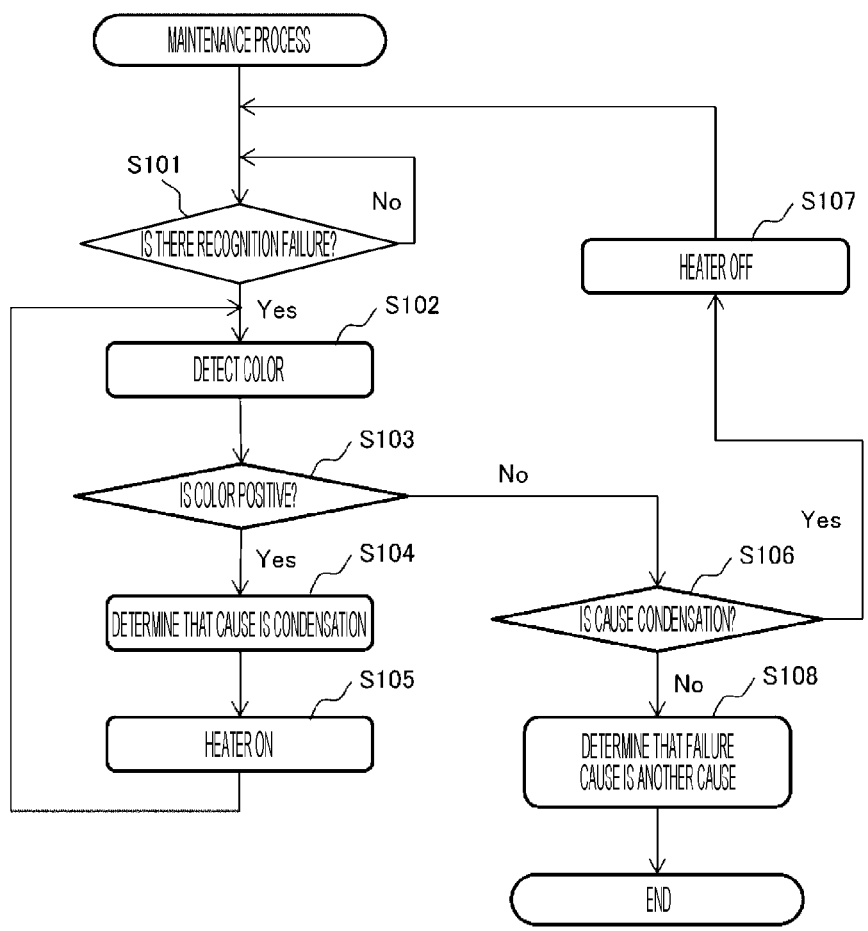
FIG. 8 is a diagram illustrating an operation flow of a second maintenance process.

FIG. 8 is a diagram illustrating an operation flow of a second maintenance process. The second maintenance process is a process of confirming the occurrence of condensation when a recognition failure occurs and performing control of the heater. The second maintenance process is performed instead of the above-described maintenance process, but may be performed in parallel. The second maintenance process is started when the vehicle-mounted optical device 100 is activated.

First, the condensation detection unit 122 determines whether a recognition failure has occurred (step S101). Specifically, the condensation detection unit 122 inquires of the image recognition processing unit 121 whether the recognition failure has occurred. When no recognition failure has occurred (in the case of "No" in step S101), the condensation detection unit 122 returns the control to step S101.

When the recognition failure has occurred (in the case of "Yes" in step S101), the condensation detection unit 122 obtains an image from the camera control unit 160 and detects a color of the image of the moisture sensitive member 3 positioned inside the imaging range 4 inside the range excluding the image recognition processing range 5 (step S102).

Then, the condensation detection unit 122 determines whether the color is positive (step S103). Specifically, when the color detected in step S102 has a predetermined chromaticity, the condensation detection unit 122 determines that the color is positive, that is, condensation has occurred. Incidentally, when determining whether the color has the predetermined chromaticity, it may be determined based on whether the color of the moisture sensitive member 3 has a predetermined luminance or more with respect to a predetermined RGB components, or it may be determined to be positive if the color is similar to a color to a predetermined degree or more when being compared with a reference color region adjoining the moisture sensitive member 3 (region having a color substantially coinciding with the color of the moisture sensitive member 3 containing moisture).

When the color is positive (in the case of "Yes" in step S103), the condensation detection unit 122 determines that the cause is condensation (step S104). Specifically, the condensation detection unit 122 causes the condensation cause storage unit 131 to store information specifying the cause as the condensation.

Then, the heater control processing unit 123 turns on the heater (step S105). Specifically, the heater control processing unit 123 issues an instruction to the heating device control unit 150 to start heating. Then, the condensation detection unit 122 returns the control to step S102.

If the color is not positive ("No" in step S103), the condensation detection unit 122 determines whether it has been determined that the cause is condensation (step S106). Specifically, the condensation detection unit 122 refers to the condensation cause storage unit 131 and determines that it has been determined that the cause is condensation if the information specifying the cause as the condensation is stored.

If it has been determined that the cause is the condensation ("Yes" in step S106), the heater control processing unit 123 turns off the heater (step S107). Specifically, the heater control processing unit 123 issues an instruction to the heating device control unit 150 to end heating. Then, the condensation detection unit 122 deletes the information specifying the cause as the condensation from the condensation cause storage unit 131, and returns the control to step S101.

If it has not been determined that the cause is condensation ("No" in step S106), the condensation detection unit 122 determines that the cause of the failure is another cause (step S108). Specifically, the condensation detection unit 122 causes the recognition failure cause storage unit 132 to store information specifying the failure cause as "other". Then, the alert transmission unit 124 transmits an alert indicating that the recognition failure has occurred to another device connected to the in-vehicle network 50 via the communication unit 140. Then, the condensation detection unit 122 terminates the maintenance process.

The processing flow of the second maintenance process has been described as above. According to the second maintenance process, when the moisture sensitive member 3 is sensitive to moisture, it is possible to remove condensation by heating the windscreen 6 using the heater. Thus, it is possible to eliminate the condensation adhering to the vehicle inner side of the glass thereby improving the reliability of the vehicle-mounted optical device. In addition, the maintenance of the vehicle-mounted optical device 100 is automatically performed, and power consumption can be suppressed to be low. Furthermore, the heater is controlled when the recognition failure has occurred, and special processing other than monitoring of the recognition failure is not performed when no recognition failure has occurred, and thus, it is possible to suppress the processing amount of computation and to suppress power consumption.

Figure 9:
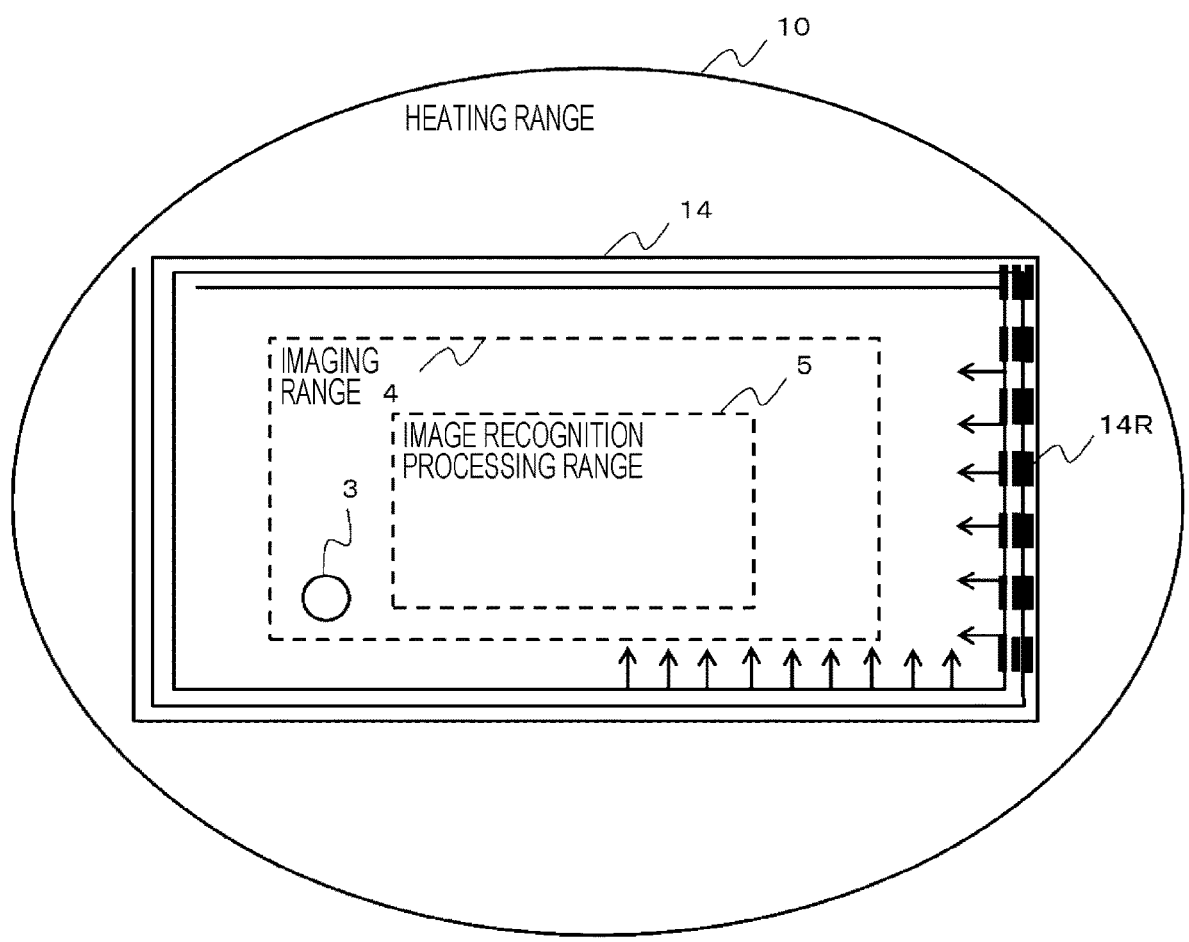
FIG. 9 is a view illustrating a preferable heating range in the first maintenance process.

FIG. 9 is a view illustrating a preferable heating range in the first maintenance process. When performing the first maintenance process, heating is applied from the moisture sensitive member 3 to the image recognition processing range 5 since the heater is installed in the vicinity of the moisture sensitive member 3 as illustrated in FIG. 2, and dew condensation water is also removed in this order. Therefore, there is a risk that a time lag which may form a state where condensation in an actual imaging range is eliminated occurs temporarily even if the optical characteristic of the moisture sensitive member 3 is a color at the time of dryness. When such a time lag occurs, a situation where it is recognized that the condensation has been eliminated in the determination based on the color of the moisture sensitive member 3 and the heat is turned off may occur although the condensation in the actual imaging range has not been eliminated. Therefore, a situation where the condensation removal is not appropriately performed may occur.

In this regard, in order to adjust balance of heating between the moisture sensitive member 3 and the imaging range 4, the heating range for heating with a higher heat amount than other sides is provided at a position opposing the moisture sensitive member 3 as illustrated in FIG. 9, so that it is possible to avoid the occurrence of the time lag that may form the state where condensation in the actual imaging range has not been eliminated even if the optical characteristic of the moisture sensitive member 3 is the color at the time of dryness.

Figure 10:
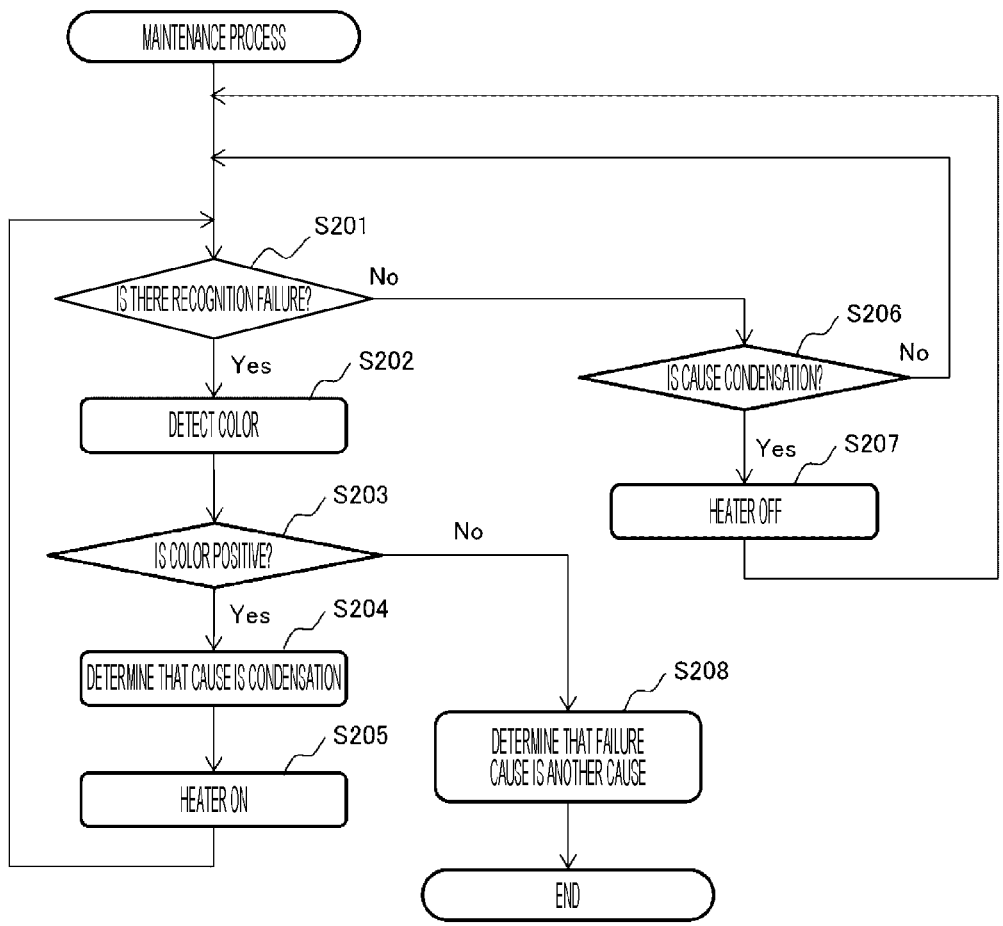
FIG. 10 is a diagram illustrating an operation flow of a third maintenance process.

FIG. 10 is a diagram illustrating an operation flow of a third maintenance process. The third maintenance process is a process of turning off the heater assuming that condensation has been eliminated when a recognition failure is eliminated. The third maintenance process is started when the vehicle-mounted optical device 100 is activated.

First, the condensation detection unit 122 determines whether a recognition failure has occurred (step S201). Specifically, the condensation detection unit 122 inquires of the image recognition processing unit 121 whether the recognition failure has occurred.

When the recognition failure has occurred (in the case of "Yes" in step S201), the condensation detection unit 122 obtains an image from the camera control unit 160 and detects a color of the image of the moisture sensitive member 3 positioned inside the imaging range 4 inside the range excluding the image recognition processing range 5 (step S202).

Then, the condensation detection unit 122 determines whether the color is positive (step S203). Specifically, when the color detected in step S202 has a predetermined chromaticity, the condensation detection unit 122 determines that the color is positive, that is, condensation has occurred. Incidentally, when determining whether the color has the predetermined chromaticity, it may be determined based on whether the color of the moisture sensitive member 3 has a predetermined luminance or more with respect to a predetermined RGB components, or it may be determined to be positive if the color is similar to a color to a predetermined degree or more when being compared with a reference color region adjoining the moisture sensitive member 3 (region having a color substantially coinciding with the color of the moisture sensitive member 3 containing moisture).

When the color is positive (in the case of "Yes" in step S203), the condensation detection unit 122 determines that the cause is condensation (step S204). Specifically, the condensation detection unit 122 causes the condensation cause storage unit 131 to store information specifying the cause as the condensation.

Then, the heater control processing unit 123 turns on the heater (step S205). Specifically, the heater control processing unit 123 issues an instruction to the heating device control unit 150 to start heating. Then, the condensation detection unit 122 returns the control to step S201.

If no recognition failure has occurred (in the case of "No" in step S201), the condensation detection unit 122 determines whether it has been determined that the cause is condensation (step S206). Specifically, the condensation detection unit 122 refers to the condensation cause storage unit 131 and determines that it has been determined that the cause is condensation if the information specifying the cause as the condensation is stored. If it has not been determined that the cause is condensation ("No" in step S206), the condensation detection unit 122 returns the control to step S201.

If it has been determined that the cause is the condensation ("Yes" in step S206), the heater control processing unit 123 turns off the heater (step S207). Specifically, the heater control processing unit 123 issues an instruction to the heating device control unit 150 to end heating. Then, the condensation detection unit 122 deletes the information specifying the cause as the condensation from the condensation cause storage unit 131, and returns the control to step S201.

If the color is not positive (in the case of "No" in step S203), the condensation detection unit 122 determines that the cause of the failure is another cause (step S208). Specifically, the condensation detection unit 122 causes the recognition failure cause storage unit 132 to store information specifying the failure cause as "other". Then, the alert transmission unit 124 transmits an alert indicating that the recognition failure has occurred to another device connected to the in-vehicle network 50 via the communication unit 140. Then, the condensation detection unit 122 terminates the maintenance process.

The processing flow of the third maintenance process has been described as above. According to the third maintenance process, when the moisture sensitive member 3 is sensitive to moisture, it is possible to remove condensation by heating the windscreen 6 using the heater. Thus, it is possible to eliminate the condensation adhering to the vehicle inner side of the glass thereby improving the reliability of the vehicle-mounted optical device. In addition, the maintenance of the vehicle-mounted optical device 100 is automatically performed, and power consumption can be suppressed to be low. Furthermore, the heater is controlled when the recognition failure has occurred, and the process of turning off the heater is performed when no recognition failure has occurred, and thus, it is possible to suppress the operation of the heater to the minimum and to suppress power consumption.

Although the description has been given in detail regarding the vehicle-mounted optical system according to the first embodiment, the present invention is not limited to the embodiment, and, of course, can be modified in various ways within a scope not departing from a gist thereof.

For example, as a second embodiment, the heater device 202 may be a condensation removal device that blows hot air to the windscreen to remove condensation. In this case, the degree of freedom of an attachment position of the camera housing 1 increases, and thus, it is easy to attach the camera housing 1 to various types of vehicles.

Figure 11:
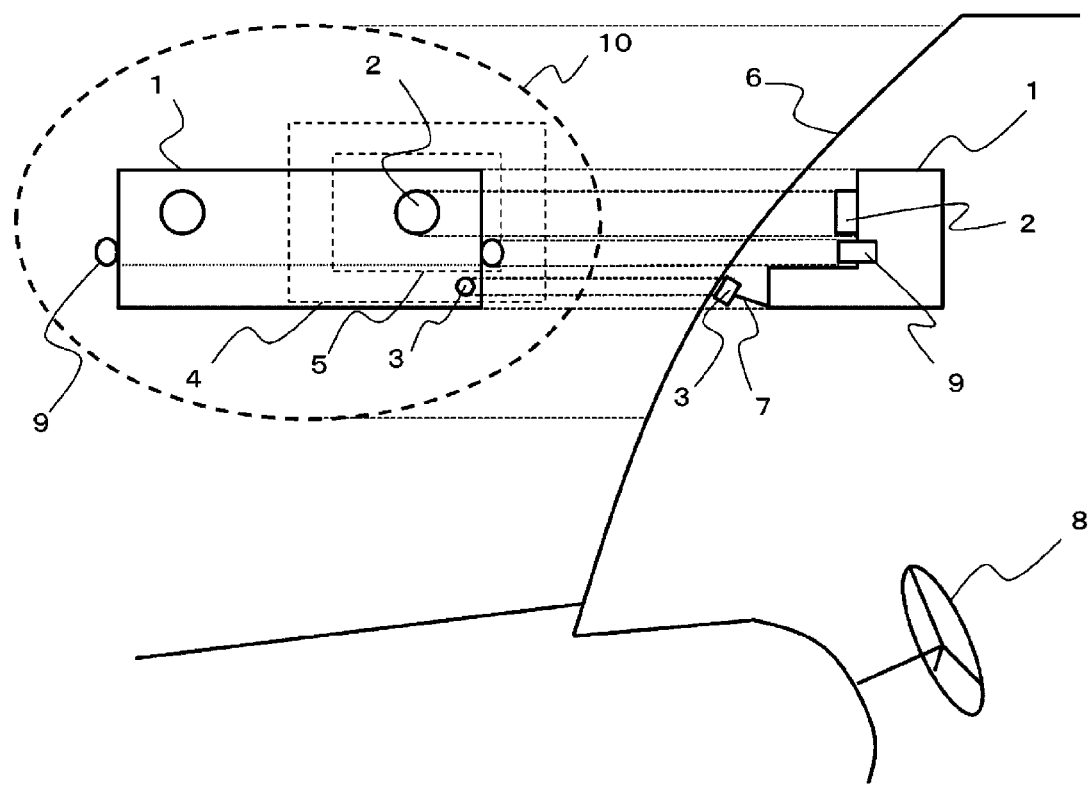
FIG. 11 is a view illustrating an outline of a vehicle-mounted optical system according to a second embodiment.

FIG. 11 is a view illustrating an outline of a vehicle-mounted optical system according to the second embodiment as described above. The vehicle-mounted optical system according to the second embodiment basically has the same configuration as that of the vehicle-mounted optical system according to the first embodiment, but there are some differences. Hereinafter, the differences will be mainly described.

The camera housing 1 according to the second embodiment includes warm air blowing holes 9 at both right and left ends thereof to be directed to the front side of the vehicle and directed to the inner side so as to converge in directions of right and left centers of the camera housing 1. The warm air blowing hole 9 blows warm air so as to strike the windscreen 6 and warms the windscreen in a heating range, thereby efficiently removing condensation. When such a vehicle-mounted optical system according to the second embodiment is adopted, it is possible to efficiently remove the condensation focusing on an imaging range of the camera housing 1 regardless of the arrangement of electric heating wires of the windscreen, and thus, the vehicle-mounted optical system can be installed universally regardless of a type of a vehicle to be mounted.

In addition, for example, the camera housing 1 may be provided with an illumination member irradiating the moisture sensitive member 3 with light having a predetermined wavelength such as white light or an independent irradiation device in order to more accurately detect the color change (positiveness) of the moisture sensitive member 3. The light emitted by the illumination member may have any wavelength as long as the camera housing 1 can detect a color in accordance with a wavelength of the color of the moisture sensitive member 3 in the positive state. For example, such light is not limited to visible light, but includes invisible light such as infrared light and ultraviolet light. Alternatively, a wavelength of light to be emitted may be calibrated in accordance with a color change caused by aged deterioration or the like of the moisture sensitive member 3. In this manner, it is possible to more reliably detect condensation even in a case where a difficulty level of color detection is high at night, in a tunnel, or the like.

In addition, for example, when the transmittance of the moisture sensitive member 3 is detected as an element for determining condensation, a shape of the moisture sensitive member 3 may be set to, for example, a polygonal shape or a lattice shape to have many edges, and condensation may be detected when the edge detection amount has decreased below the predetermined amount by utilizing a fact that the edge amount changes depending on a change of the transmittance. In this manner, it is possible to more reliably detect condensation even in a case where a difficulty level of color detection is high at night, in a tunnel, or the like.

Incidentally, the configuration has been described in detail in the above-described embodiments in order to describe the present invention in an easily understandable manner, and is not necessarily limited to one including the entire configuration that has been described above.

In addition, a part or all of each of the above-described configurations, functions, processing units, and the like may be realized, for example, by hardware by designing with an integrated circuit and the like. In addition, only control lines and information lines considered to be necessary for the description have been illustrated, and all of the control lines and information lines required as a product are not necessarily illustrated. It may be considered that most of configurations are practically connected to each other.

In addition, each of the above-described configurations, functions, processing units, and the like may be realized by distributed systems by executing a part or the whole thereof, for example, with different devices and performing integration processing via a network.

In addition, technical elements of the above-described embodiments may be applied singularly or may be applied in the state of being divided into a plurality of components such as program components and hardware components.

In addition, the windscreen has been exemplified assuming the condensation on the windscreen in the above-described embodiments, the invention is not limited thereto, and may be any device configured to remove condensation from windows, frames, doors, and the like of all directions of the vehicle.

The present invention has been described focusing on the embodiments as above.

REFERENCE SIGNS LIST 1 vehicle-mounted optical system
50 in-vehicle network
100 vehicle-mounted optical device
120 control unit
121 image recognition processing unit
122 condensation detection unit
123 heater control processing unit
124 alert transmission unit
130 storage unit
131 condensation cause storage unit
132 recognition failure cause storage unit
140 communication unit
150 heating device control unit
160 camera control unit
170 bus
180 heating device
190 camera device

The invention claimed is:

1. A vehicle-mounted optical device comprising:
an imaging unit that captures an outside of a vehicle through glass mounted to the vehicle to obtain an image;
a condensation detection unit that detects condensation of the glass by determining whether an image in a predetermined range of a part of the image is in a predetermined state;
a condensation removal device control processing unit that actuates a condensation removal device which removes condensation of the glass when the condensation detection unit detects the condensation; and
an image recognition processing unit that performs a predetermined process of exerting influence on a travel control system of the vehicle using an image specified in a predetermined position and range out of the image captured by the imaging unit,
wherein the imaging unit captures the image having a parallax,
the image recognition processing unit performs a process of determining a distance to an obstacle included in the image having the parallax, and
the condensation detection unit detects condensation with another range excluding an image in a range used in the process of determining the distance by the image recognition processing unit out of the image having the parallax as the predetermined range of the part,
an irradiation unit that irradiates the vehicle glass corresponding to the predetermined range of the part of the image with light having a predetermined frequency, and
wherein the condensation detection unit uses an image obtained by capturing a moisture sensitive member in contact with a predetermined position of an inner side of the vehicle of the vehicle glass as the image in the predetermined range of the part.

2. The vehicle-mounted optical device according to claim 1, wherein
the condensation detection unit determines that the image is in the predetermined state when the image in the predetermined range has any of a predetermined chromaticity, a predetermined luminance, or an edge detection amount equal to or less than a predetermined amount.

3. The vehicle-mounted optical device according to claim 1, further comprising
an image recognition processing unit that performs a predetermined process of exerting influence on a travel control system of the vehicle using an image specified in a predetermined position and range out of the image captured by the imaging unit,
wherein the condensation detection unit detects condensation with a range excluding the image used for the predetermined process by the image recognition processing unit as the predetermined range of the part.

4. The vehicle-mounted optical device according to claim 1, further comprising
a support member that supports the moisture sensitive member in contact with the predetermined position of the inner side of the vehicle of the vehicle glass.

5. The vehicle-mounted optical device according to claim 1, wherein
the condensation detection unit uses an image obtained by capturing the moisture sensitive member formed at the predetermined position of an inner side of the vehicle of the vehicle glass as the image in the predetermined range of the part.

* * * * *